(12) United States Patent
Mizushima et al.

(10) Patent No.: US 8,608,846 B2
(45) Date of Patent: Dec. 17, 2013

(54) LIQUID SILICONE RUBBER COATING COMPOSITION, CURTAIN AIRBAG, AND ITS PRODUCTION METHOD

(75) Inventors: Hidenori Mizushima, Annaka (JP); Masayuki Ikeno, Annaka (JP); Shinji Irifune, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 480 days.

(21) Appl. No.: 12/879,488

(22) Filed: Sep. 10, 2010

(65) Prior Publication Data

US 2011/0064882 A1    Mar. 17, 2011

(30) Foreign Application Priority Data

Sep. 11, 2009  (JP) ................................. 2009-210334

(51) Int. Cl.
*C04B 41/49*  (2006.01)

(52) U.S. Cl.
USPC ................. 106/287.14; 106/287.15; 427/387; 280/728.1

(58) Field of Classification Search
USPC ......................... 427/387; 106/287.14, 287.15; 280/728.1
See application file for complete search history.

(56) References Cited

U.S. PATENT DOCUMENTS

| | | | |
|---|---|---|---|
| 5,691,435 A * | 11/1997 | Herzig et al. ................... | 528/15 |
| 5,877,256 A | 3/1999 | Nakamura et al. | |
| 6,387,520 B1 | 5/2002 | Fujiki et al. | |
| 2009/0001690 A1 * | 1/2009 | Ikeno et al. ................ | 280/728.1 |

FOREIGN PATENT DOCUMENTS

| | | |
|---|---|---|
| EP | 2 009 059 A2 | 12/2008 |
| EP | 2 009 059 A3 | 12/2008 |
| JP | 5-214295 A | 8/1993 |
| JP | 2001-59052 A | 3/2001 |
| JP | 2001-287610 A | 10/2001 |
| JP | 2002-138249 A | 5/2002 |
| WO | WO 2007/015944 A2 | 2/2007 |
| WO | WO 2007/015944 A3 | 2/2007 |

OTHER PUBLICATIONS

European Search Report issued Nov. 30, 2010, in EP10251573.1.

* cited by examiner

*Primary Examiner* — Robert S Walters, Jr.
(74) *Attorney, Agent, or Firm* — Birch, Stewart, Kolasch & Birch, LLP

(57) ABSTRACT

A liquid silicone rubber coating composition exhibiting high adhesion for an airbag base fabric; a curtain airbag having a silicone rubber coating layer of the cured composition formed on at least one surface of the base fabric; and a method for producing such curtain airbag are provided. The composition comprises (A) an organopolysiloxane having at least 2 alkenyl groups bonded to the silicon atoms per molecule; (B) an organohydrogenpolysiloxane having at least 2 structural units represented by formula (1) per molecule, the structural units being linked by a non-siloxane structural unit not containing SiH group; (C) an addition catalyst; (E) an organosilicon compound having an epoxy group and an alkoxy group bonded to the silicon atom in the molecule; and (F) a titanium compound and/or a zirconium compound; and preferably (D) a fine powder silica having a specific surface area of at least 50 m²/g.

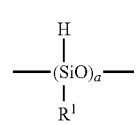

(1)

14 Claims, No Drawings

LIQUID SILICONE RUBBER COATING COMPOSITION, CURTAIN AIRBAG, AND ITS PRODUCTION METHOD

CROSS-REFERENCE TO RELATED APPLICATION

This non-provisional application claims priority under 35 U.S.C. §119(a) on Patent Application No. 2009-210334 filed in Japan on Sep. 11, 2009, the entire contents of which are hereby incorporated by reference.

TECHNICAL FIELD

This invention relates to a liquid silicone rubber coating composition adapted for use in producing an airbag installed in a vehicle comprising a fiber cloth of 6,6-nylon, 6-nylon, polyester or the like having a silicone rubber coating film formed thereon; and in particular, a liquid silicone rubber coating composition adapted for use in producing a curtain airbag which is to be accommodated along the A-pillar to the roof side and which is different from the airbag for the driver or passenger side, and whose inflated state should be maintained for a certain period for the protection of the passenger's head and prevention of the passenger from being thrown out of the vehicle upon collision or roll-over of the vehicle. This invention also relates to a curtain airbag having a silicone rubber coating layer formed by curing such composition as well as its production method.

BACKGROUND ART

Various silicone rubber compositions for airbag have been disclosed for the formation of the rubber film on the fiber surface. For example, JP-A 5-214295 discloses a liquid silicone rubber coating composition for an airbag having improved adhesion to the base fabric prepared by adding an inorganic filler, an organopolysiloxane resin, and an epoxy group-containing organosilicon compound to an addition curable composition. JP-A 2002-138249 discloses a liquid silicone rubber coating composition for an airbag which exhibits good adhesiveness to the base fabric by thermally curing in a short period. This composition is prepared by adding an inorganic filler, an organopolysiloxane resin, an organotitanium compound, an alkyl silicate or an alkyl polysilicate as an addition curable composition. JP-A 2001-287610 discloses a liquid silicone rubber coating composition for an airbag highly adapted for forming a thin film wherein viscosity of the vinyl group-containing organopolysiloxane has been limited to up to 8,000 centipoise. JP-A 2001-59052 discloses a liquid silicone rubber composition for coating having a reduced tackiness prepared by adding a wet silica having a specific surface area measured by BET method on the average of 150 to 250 $m^2/g$ and an average particle size of up to 20 μm to the rubber coating composition.

However, these compositions were insufficient in the adhesion to the underlying base fabric of the airbag when used for the application of curtain airbag, since leakage of the gas used for the inflation of the airbag could not be suppressed for the time required to maintain the airbag inflated for a sufficient time.

SUMMARY OF INVENTION

The present invention has been completed in view of the situation as described above, and an object of the present invention is to provide a liquid silicone rubber coating composition which exhibits high adhesion to the airbag base fabric when used for the production of a curtain airbag. Another object of the present invention is to provide a curtain airbag comprising the substrate and a silicone rubber coating layer formed by coating and curing such composition on at least one surface of the substrate as well as a method for producing such curtain airbag.

In order to achieve such objects, the inventors of the present invention carried out an extensive study and found that when a liquid silicone rubber coating composition comprising (A) an organopolysiloxane having at least 2 alkenyl groups bonded to silicon atoms per molecule; (B) an organohydrogenpolysiloxane having at least 2 structural units represented by the following formula (1) per molecule, these structural units being linked by a non-siloxane structural unit not containing a SiH group; (C) an addition reaction catalyst; (E) an organosilicon compound having epoxy group and an alkoxy group bonded to a silicon atom in the molecule; and (F) one or both of a titanium compound and a zirconium compound; and preferably further comprising (D) fine powder silica having a specific surface area of at least 50 $m^2/g$ is used for the silicone rubber coating layer of a curtain airbag, inflation of the curtain airbag can be maintained for a certain time because the coating layer is strongly bonded to the base fabric of the air bag and the leakage of the gas used for the inflation can be suppressed. The present invention has been completed on the basis of such finding.

Accordingly, the present invention provides a liquid silicone rubber coating composition, a curtain airbag, and its production method.

[I] A liquid silicone rubber coating composition comprising (A) 100 parts by weight of an organopolysiloxane having at least 2 alkenyl groups bonded to silicon atoms per molecule;

(B) an organohydrogenpolysiloxane comprising in the molecule at least 2 structural units represented by the following formula (1), which are connected together via a SiH-free non-siloxane structural unit,

(1)

wherein $R^1$ is an unsubstituted or substituted monovalent hydrocarbon group having 1 to 10 carbon atoms and a is an integer of 2 or more, in an amount such that 1 to 10 hydrogen atoms bonded to silicon atoms in component (B) are present in relation to one alkenyl group bonded to a silicon atom in component (A);

(C) an effective amount of an addition reaction catalyst;

(D) 0 to 50 parts by weight of fine powder silica having a specific surface area of at least 50 $m^2/g$;

(E) 0.1 to 10 parts by weight of an organosilicon compound having an epoxy group and an alkoxy group bonded to a silicon atom in the molecule; and (F) 0.1 to 5 parts by weight of at least one member selected from a titanium compound and a zirconium compound.

[II] The liquid silicone rubber coating composition according to the above [I] wherein the organohydrogenpolysiloxane of component (B) comprises the structure in which one or two or more structural units of the following formula (2) are connected:

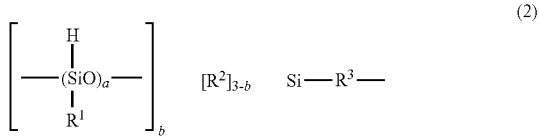

(2)

wherein $R^1$ and a are as defined above, $R^2$ is a substituted or unsubstituted monovalent hydrocarbon group of 1 to 10 carbon atoms, $R^3$ is a substituted or unsubstituted divalent hydrocarbon group of at least 2 carbon atoms which may contain a silicon atom, and b is 1, 2 or 3.

[III] The liquid silicone rubber coating composition according to the above [II] wherein $R^3$ in the organohydrogenpolysiloxane of formula (2) in component (B) is a straight chain, branched, or cyclic alkylene group having 2 to 20 carbon atoms which may contain a diorganosilylene group; or a divalent aromatic hydrocarbon group having 6 to 40 carbon atoms containing 1 to 4 phenylene skeletons which may contain a diorganosilylene group.

[IV] The liquid silicone rubber coating composition according to any one of the above [I] to [III] wherein the organohydrogenpolysiloxane of component (B) is linear or branched and terminated with a $(R^2)_3SiO$— and/or $H(R^2)_2SiO$— group wherein $R^2$ is a substituted or unsubstituted monovalent hydrocarbon group of 1 to 10 carbon atoms.

[V] The liquid silicone rubber coating composition according to any one of the above [I] to [IV] wherein component (F) is an organotitanium compound.

[VI] The liquid silicone rubber coating composition according to the above [V] wherein the organotitanium compound of component (F) is an organotitatnate, an organotitanium chelate compound, or a combination thereof.

[VII] The liquid silicone rubber coating composition according to any one of the above [I] to [IV] wherein component (F) is an organozirconium compound.

[VIII] The liquid silicone rubber coating composition according to the above [VII] wherein the organozirconium compound of component (F) is an organozirconium ester, an organozirconium chelate compound, or a combination thereof.

[IX] The liquid silicone rubber coating composition according to any one of the above [I] to [VIII] wherein the composition is the one used for producing a curtain airbag.

[α] A method for producing a curtain airbag comprising the steps of coating the coating composition of any one of the above [I] to [VIII] on at least one surface of a substrate comprising a fiber cloth, and curing the coating composition to form a silicone rubber coating layer of the cured product of the coating composition on at least one surface of the substrate.

[XI] A curtain airbag comprising a substrate comprising a fiber cloth and a silicone rubber coating layer formed by coating and curing the coating composition of any one of the above [I] to [VIII] on at least one surface of the substrate.

ADVANTAGEOUS EFFECTS OF INVENTION

The liquid silicone rubber coating composition of the present invention exhibits excellent adhesion to the base fabric for airbags. The curtain airbag comprising the base fabric and the silicone rubber coating layer formed on at least one surface of the base fabric by coating and curing the coating composition is capable of maintaining the inflated state for a sufficient period by suppressing leakage of the gas used for the inflation.

DESCRIPTION OF EMBODIMENTS

The present invention is described in further detail. In the present invention, viscosity is the one measured by a rotary viscometer.

Liquid Silicone Rubber Coating Composition

The liquid silicone rubber coating composition of the present invention comprises the following components (A) to (F) with the component (D) being an optional component, and this liquid silicone rubber coating composition is liquid at room temperature (namely, 25° C., and this applies to the following description). Next, each component is described in detail.

Component (A)

Component (A) is an organopolysiloxane which has at least 2 alkenyl groups bonded to silicon atoms per molecule, and this component (A) is the base polymer of the coating composition of the present invention. One organopolysiloxane or two or more organopolysiloxanes may be used as component (A).

Component (A) may have a molecular structure such as linear (straight chain), cyclic, branched, or three-dimensional network structure. Component (A) is preferably a straight chain diorganopolysiloxane having a backbone basically comprising a recurrence of diorganosiloxane unit, wherein the backbone is capped at both ends with a triorganosiloxy group. The organo group of the triorganosiloxy group may include an alkenyl group. When the organopolysiloxane of component (A) has a linear or branched molecular structure, the position of the silicon atom having the alkenyl group bonded thereto in the organopolysiloxane molecule may be either or both of the ends of the molecular chain or the midst of the molecular chain (not at the end of the molecular chain). Most preferably, component (A) is a linear diorganopolysiloxane having an alkenyl group bonded at least to the silicon atom at each of the both ends of the molecular chain.

The alkenyl group bonded to the silicon atom in component (A) may be independently a substituted or unsubstituted alkenyl group each typically having 2 to 8 carbon atoms, and preferably 2 to 4 carbon atoms. Examples include vinyl group, allyl group, propenyl group, butenyl group, pentenyl group, hexenyl group, cyclohexenyl group, and heptenyl group, and the most preferred is vinyl group.

The content of the alkenyl group bonded to the silicon atom in component (A) is preferably about 0.001 to 10% by mole, and more preferably about 0.01 to 5% by mole in relation to all of the monovalent organic groups (that is, the substituted or unsubstituted monovalent hydrocarbon group) bonded to the silicon atom.

Component (A) may also contain a monovalent organic group bonded to the silicon atom other than the alkenyl group bonded to the silicon atom. The monovalent organic group bonded to the silicon atom may be independently a substituted or unsubstituted monovalent organic group having 1 to 12 carbon atoms, and preferably, 1 to 10 carbon atoms, and the monovalent hydrocarbon group may be optionally substituted with a halogen atom. Examples of the organic group include alkyl groups such as methyl group, ethyl group, propyl group, butyl group, pentyl group, hexyl group, cyclohexyl group, and heptyl group; aryl groups such as phenyl group, tolyl group, xylyl group, and naphthyl group; aralkyl groups such as benzyl group and phenethyl group; halogenated alkyl groups such as chloromethyl group, 3-chloropropyl group, and 3,3,3-trifluoropropyl group; and the most preferred are methyl group and phenyl group.

Component (A) may have a viscosity at 25° C. in the range of 100 to 500,000 mPa·s, and more preferably 300 to 100,000 mPa·s. When the viscosity is within such range, the resulting composition will be easy to handle, and the resulting silicone rubber (cured product) will enjoy excellent physical properties.

A preferable example of the component (A) is an organopolysiloxane represented by the following average compositional formula (3):

$$R_aSiO_{(4-a)/2} \quad (3)$$

wherein R is independently a substituted or unsubstituted monovalent hydrocarbon group having 1 to 10 carbon atoms, and preferably 1 to 8 carbon atoms; a is a positive number in the range of 1.5 to 2.8, preferably 1.8 to 2.5, and more preferably 1.95 to 2.05; with the proviso that 0.001 to 10% by mole, and preferably 0.01 to 5% by mole of all Rs is an alkenyl group.

Examples of R include those mentioned for the alkenyl group bonded to the silicon atom in component (A) and those mentioned for the organic group bonded to the silicon atom in component (A) other than the alkenyl group of component (A).

Examples of the organopolysiloxanes of component (A) include dimethylsiloxane-methylvinylsiloxane copolymer capped at both ends of the molecular chain with trimethylsiloxy group; methylvinylpolysiloxane capped at both ends of the molecular chain with trimethylsiloxy group; dimethylsiloxane-methylvinylsiloxane-methylphenylsiloxane copolymer capped at both ends of the molecular chain with trimethylsiloxy group; dimethylpolysiloxane capped at both ends of the molecular chain with dimethylvinylsiloxy group; methylvinylpolysiloxane capped at both ends of the molecular chain with dimethylvinylsiloxy group; dimethylsiloxane-methylvinylsiloxane copolymer capped at both ends of the molecular chain with dimethylvinylsiloxy group; dimethylsiloxane-methylvinylsiloxane-methylphenylsiloxane copolymer capped at both ends of the molecular chain with dimethylvinylsiloxy group; dimethylpolysiloxane capped at both ends of the molecular chain with divinyl methylsiloxy group; dimethylsiloxane-methylvinylsiloxane copolymer capped at both ends of the molecular chain with divinylmethylsiloxy group; dimethylpolysiloxane capped at both ends of the molecular chain with trivinylsiloxy group; dimethylsiloxane-methylvinylsiloxane copolymer capped at both ends of the molecular chain with trivinylsiloxy group; an organosiloxane copolymer comprising the siloxane unit represented by formula: $R'_3SiO_{0.5}$, the siloxane unit represented by formula: $R'_2R''SiO_{0.5}$, unit represented by formula: $R'_2SiO_2$ and unit represented by formula: $SiO_2$; an organosiloxane copolymer comprising the siloxane unit represented by formula: $R'_3SiO_{0.5}$, the siloxane unit represented by formula: $R'_2R''SiO_{0.5}$; and the siloxane unit represented by formula: $SiO_2$; an organosiloxane copolymer comprising the siloxane unit represented by formula: $R'_2R''SiO_{0.5}$, the siloxane unit represented by formula: $R'_2SiO$, and the siloxane unit represented by formula: $SiO_2$; an organosiloxane copolymer comprising the siloxane unit represented by formula: $R'R''SiO_2$ and the siloxane unit represented by formula: $R'SiO_{1.5}$, or the siloxane unit represented by formula: $R''SiO_{0.5}$; and mixtures of two or more of the foregoing organopolysiloxanes.

In the formula, R' is independently a substituted or unsubstituted monovalent hydrocarbon group other than the alkenyl group, and examples include alkyl groups such as methyl group, ethyl group, propyl group, butyl group, pentyl group, hexyl group, cyclohexyl group, and heptyl group; aryl groups such as phenyl group, tolyl group, xylyl group, and naphthyl group; aralkyl group such as benzyl group and phenethyl group; and halogenated alkyl groups such as chloromethyl group, 3-chloropropyl group, and 3,3,3-trifluoropropyl group. R" is an alkenyl group such as vinyl group, allyl group, butenyl group, pentenyl group, hexenyl group, and heptenyl group.

Component (B)

Component (B) is an organohydrogenpolysiloxane which is a component critical for the production of a cured silicone rubber product having a strength sufficient for practical use. More specifically, the organohydrogenpolysiloxane of component (B) acts as a crosslinking agent through the reaction of the hydrogen atom bonded to the silicon atom in the molecule (namely, SiH group) in the organohydrogenpolysiloxane with the alkenyl group in the component (A) by hydrosilylation (addition reaction), and the crosslinked structure is thereby formed. The organohydrogenpolysiloxane is the one having a structure comprising in the molecule at least two structural units represented by the following formula (1), which are connected to each other via a SiH-free non-siloxane structural unit.

In formula (1), $R^1$ is a substituted or unsubstituted monovalent hydrocarbon group having 1 to 10 carbon atoms; and a is an integer of at least 2, preferably 2 to 200, more preferably 3 to 100, and most preferably 4 to 50 (namely, a repetition of the divalent organohydrogensiloxane unit) in one molecule. The structural unit of formula (1) is thus a repetition of the divalent organohydrogensiloxane unit. Each structural unit of formula (1) is linked each other by a non-siloxane structural unit having no SiH group (namely, the structural unit not containing SiH group and —SiO— bond, and more particularly, a structural unit comprising a divalent hydrocarbon group not containing SiH group and —SiO— bond although the divalent hydrocarbon group may contain silicon atom).

In the general formula (1), $R^1$ is independently a substituted or unsubstituted monovalent hydrocarbon group having 1 to 10, preferably 1 to 8 carbon atoms, and preferably not containing an aliphatic unsaturated bond. Exemplary such $R^1$ include alkyl groups such as methyl group, ethyl group, propyl group, isopropyl group, butyl group, isobutyl group, tert-butyl group, hexyl group, octyl group, and decyl group; aryl groups such as phenyl group, tolyl group, xylyl group, and naphthyl group; cycloalkyl groups such as cyclohexyl group; aralkyl groups such as benzyl group and phenylethyl group; halogenated hydrocarbon groups such as chloromethyl group, bromoethyl group, and trifluoropropyl group; and cyanated hydrocarbon group such as cyanoethyl group. Among these, the preferred are methyl group and phenyl group as in the case of the component (A). Of the organohydrogenpolysiloxanes having the general formula (1), those where all $R^1$s are either methyl group or phenyl group, and those wherein a part of the $R^1$ is methyl group and the remainder is phenyl group are easy to synthesize, and such organohydrogenpolysiloxanes are also chemically stable.

The organohydrogenpolysiloxane of component (B) may be linear, branched, cyclic, and the like. Preferably the organohydrogenpolysiloxane of component (B) has a linear or branched structure and is terminated with a triorganosiloxy group such as $(R^2)_3SiO$— group and/or hydrogendiorganosiloxy group such as $H(R^2)_2SiO-$ group wherein $R^2$ is a substituted or unsubstituted monovalent hydrocarbon group of 1 to 10 carbon atoms.

Also preferably the organohydrogenpolysiloxane of component (B) comprises the structure in which one or two or more structural unit represented by formula (2) are connected each other. More preferably the organohydrogenpolysiloxane of component (B) comprises the structure in which two of or in the structural unit of formula (2) are connected each other.

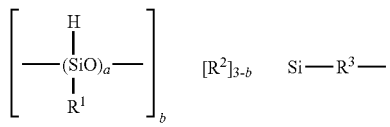
(2)

In formula (2), $R^1$ and a are as defined above, $R^2$ is preferably a group not containing an aliphatic unsaturated bond which is a substituted or unsubstituted monovalent hydrocarbon group having 1 to 10 carbon atoms, as in $R^1$ defined above. Examples of $R^2$ include alkyl groups such as methyl group, ethyl group, propyl group, and butyl group; cycloalkyl groups such as cycloalkyl group and phenyl group; aryl groups such as tolyl group; and any of the above mentioned groups having one or more or all of the hydrogen atoms bonded to the carbon atom substituted with hydroxyl group, cyano group, or halogen atom such as hydroxypropyl group, cyanoethyl group, 1-chloropropyl group, and 3,3,3-trifluoropropyl group.

$R^3$ is a substituted or unsubstituted divalent hydrocarbon group having at least 2 carbon atoms, and more preferably, a linear (straight chain), branched, or cyclic alkylene group having 2 to 20, and in particular, 3 to 10 carbon atoms optionally containing a diorganosilylene group ($-(R^2)_2Si-$ structure); or an aromatic group such as a divalent arylene group or an alkylene-arylene group having 6 to 40, and in particular, 10 to 30 carbon atoms in which 1 to 4, and in particular, 1 to 2 phenylene skeletons are contained and optionally containing a diorganosilylene group ($-(R^2)_2Si-$ structure).

The subscript b is 1, 2 or 3. When b is 1, the unit of formula (2) is divalent. When b is 2, the unit of formula (2) is trivalent. When b is 3, the unit of formula (2) is tetravalent. Preferably, b is 1 or 2. More preferably, b is 1. Accordingly, formula (2) may be rewritten as the following formulae (2)-1, (2)-2 and (2)-3.

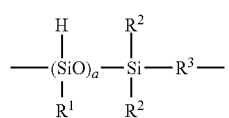
(2)-1

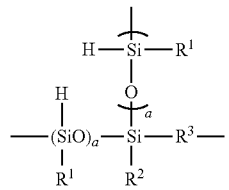
(2)-2

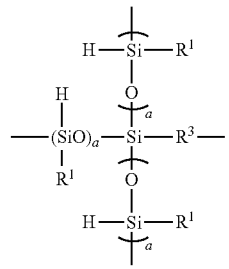
(2)-3

The organohydrogenpolysiloxane of component (B) preferably has the structure in which one or two or more of the structural unit of the above formula (2)-1 are connected each other, especially two of $-R^3-$ in the above formula (2)-1 are connected each other.

The structural unit represented by formula (1) (the repetition of the divalent organohydrogensiloxane units) is distributed in component (B) in the state linked by the to non-siloxane structural unit not containing SiH group. The number of the structural units represented by formula (1) is at least 2, preferably 2 to 10, more preferably 2 to 6, and more preferably 2 to 4 in all of the organohydrogenpolysiloxane in component (B).

The organohydrogenpolysiloxane (B) may have a linear (straight chain), cyclic, or branched structure, and preferably, a linear structure. Also preferred is the one in which the both ends of the molecular chain are capped with a triorganosiloxy group such as $(R^2)_3SiO-$ group wherein $R^2$ is as defined above.

In the present invention, one or more types of the organohydrogenpolysiloxane may be used for component (B).

The organohydrogenpolysiloxane of component (B) may have a viscosity at 25° C. of preferably 1 to 500 mPa·s, and more preferably 5 to 100 mPa·s.

The method for preparing the organohydrogenpolysiloxane is not limited as long as the desired structure is maintained. Typically it is prepared by effecting addition reaction between a siloxane monomer having the following general formula (3), (4), (5) or (6) and a non-siloxane compound having alkenyl groups at both ends to add SiH groups of the siloxane monomer of formula (3), (4), (5) or (6) to the alkenyl groups at both ends of the non-siloxane compound thereby forming an adduct, and then effecting acid equilibration reaction between the adduct and a SiH-containing cyclic siloxane.

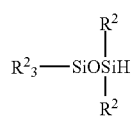
(3)

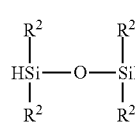
(4)

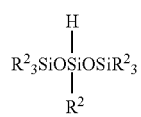
(5)

-continued

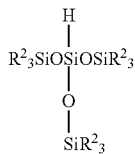
(6)

wherein $R^2$ is an optionally substituted monovalent hydrocarbon group of 1 to 10 carbon atoms.

The non-siloxane compound having alkenyl groups at both ends may be a compound having alkenyl groups at both ends of an alkylene structure.

In one preferred method, a siloxane monomer having the formula (7):

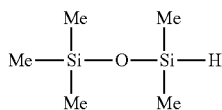
(7)

wherein Me is methyl is reacted with a both end alkenyl-capped non-siloxane compound (ex. a compound having alkenyl groups at both ends of an alkylene structure) to synthesize an adduct 1 having a siloxane unit and a silalkylene linkage in the molecule. Then acid equilibration reaction is effected between adduct 1 and a SiH-containing cyclic siloxane such as 1,3,5,7-tetramethylcyclotetrasiloxane, thereby introducing units of formula (1) into the siloxane moiety in adduct 1. There is obtained an organohydrogenpolysiloxane in which units of the formula:

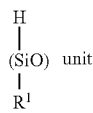

wherein $R^1$ is as defined above are incorporated as block units.

Examples of the non-siloxane compound having alkenyl groups at both ends include 1,3-butadiene, 1,3-pentadiene, 1,4-pentadiene, 1,3-hexadiene, 1,4-hexadiene, 1,5-hexadiene, 2,4-hexadiene, 1,6-heptadiene, 1,7-octadiene, 1,8-nonadiene, 1,9-decadiene, 1,3-cyclohexadiene, 1,4-cyclohexadiene, norbornadiene, and 1,3-divinyl-1,1,3,3-tetramethyldisiloxane.

Examples of the SiH-containing cyclic siloxane include those of the following formula (8):

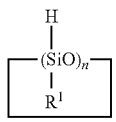
(8)

wherein $R^1$ is as defined above, and n is an integer of at least 3, preferably 3 to 10, more preferably 4 to 7, for example, 1,3,5,7-tetramethylcyclotetrasiloxane, 1,3,5,7,9-pentamethylcyclopentasiloxane, and 1,3,5,7,9,11-hexamethylcyclohexasiloxane.

In the first step, the siloxane monomer of formula (3) to (6) and the alkenyl-containing compound are preferably combined in such amounts that 0.8 to 1.2 moles of alkenyl groups from the alkenyl-containing compound may be available per mole of SiH groups from formula (3) to (6). Addition reaction may be effected by a standard technique. An addition reaction catalyst such as platinum or platinum compounds may be used in such an amount as to provide 1 to 200 ppm of platinum based on the total weight of the alkenyl-containing compound used. Reaction may run at a temperature of 30 to 150° C., preferably 50 to 120° C. The reaction time is usually 30 minutes to 24 hours.

In the second step, adduct 1 and the SiH-containing cyclic siloxane are preferably combined in such amounts that 0.1 to 50 moles of the SiH-containing cyclic siloxane is present per mole of adduct 1. Acid equilibration reaction may also be effected by a standard technique. The acid may be any of those acids commonly used in acid equilibration reaction, preferably sulfuric acid, methanesulfonic acid, and trifluoromethanesulfonic acid. The acid may be used in an amount of 0.01 to 10% by weight based on the total weight of adduct 1 and the SiH-containing cyclic siloxane. Acid equilibration reaction may run at a temperature of 5 to 100° C., preferably 20 to 70° C. The reaction time is usually 1 to 48 hours.

Component (B) is used in an amount such that typically 1 to 10, and preferably 1 to 7 hydrogen atoms bonded to the silicon atoms in component (B) would be present per one alkenyl group bonded to the silicon atom in component (A). When incorporated in an amount such that less than 1 hydrogen atom bonded to the silicon atom in component (B) would be present per one alkenyl group bonded to the silicon atom in component (A), the resulting composition is likely to suffer from insufficient curing. When incorporated so that more than 10 hydrogen atoms bonded to the silicon atoms in component (B) would be present per one alkenyl group bonded to the silicon atom in component (A), the resulting rubber is likely to suffer from extremely poor heat resistance.

The composition of the present invention may optionally contain another organohydrogenpolysiloxane in addition to component (B) and component (E) as described later. In such a case, component (B), component (E), and the organohydrogenpolysiloxane other than components (B) and (E) are preferably incorporated so that 1 to 10, and in particular, 1 to 7 SiH groups in all of these components would be present per one alkenyl group bonded to the silicon atom in the entire composition, and in particular, per one alkenyl group in component (A). The molar ratio of the SiH groups in component (B) in relation to the SiH groups in all of these components is about 0.5 to 1, and in particular, about 0.7 to 1.

Component (C)

Component (C) is an addition reaction catalyst. The addition reaction catalyst is not particularly limited as long as it promotes hydrosilylation reaction of the alkenyl group bonded to the silicon atom in component (A) with the SiH group in component (B), and one type or two or more types of component (C) may be used. Examples of component (C) include platinum group metals such as platinum, palladium, and rhodium; and compounds of the platinum group metal such as chloroplatinic acid, alcohol-modified chloroplatinic acid, coordination compound of chloroplatinic acid with an olefin, vinylsiloxane, or acetylene compound, tetrakis(triphenylphosphine) palladium, or chrolotris(triphenylphosphine) rhodium. The most preferred are platinum compounds.

Component (C) is incorporated in an effective amount of the addition reaction catalyst, and preferably, such an amount that the addition reaction catalyst is in an amount in the range of 1 to 500 ppm, and more preferably 10 to 100 ppm in terms of the weight of the catalyst metal element in relation to the total weight of components (A) and (B). When incorporated in such amount, the addition reaction is likely to be sufficiently promoted to assure sufficient curing, and since the addition reaction rate increases with the increase in the amount of the catalyst added, the addition of the catalyst in such amount is also economically advantageous.

Component (D)

In the present invention, fine powder silica is used as an optional component (D), and this fine powder silica acts as a reinforcing agent by imparting high tear strength to the cured product of the coating composition. The use of the fine powder silica of component (D) for the reinforcing agent enables formation a coating film having excellent tear strength. The fine powder silica of component (D) has a specific surface area of typically at least 50 m$^2$/g, preferably 50 to 400 m$^2$/g, and more preferably 100 to 300 m$^2$/g. When the specific surface area is within such range, the resulting cured product is more likely to be imparted with the high tear strength. The specific surface area is measured by BET method, and one type or two or more types of the fine powder silica may be used for component (D).

The fine powder silica of component (D) may be any fine powder silica that has been used as a reinforcement filler for a silicone rubber as long as the specific surface area is within such range. Exemplary such fine powder silicas include fumed silica and precipitated silica.

Such fine powder silica may be used with no surface treatment. However, the fine powder silica may be used after hydrophobicizing the fine powder silica with an organosilicon compound to provide high fluidity with the composition of the present invention. Exemplary organosilicon compounds include methylchlorosilanes such as trimethylchlorosilane, dimethyldichlorosilane, and methyltrichlorosilane; dimethylpolysiloxanes; and hexaorganodisilazanes such as hexamethyldisilazane, divinyltetramethyldisilazane, and dimethyltetravinyldisilazane.

The component (D) may be incorporated in an amount of up to 50 parts by weight (namely at 0 to 50 parts by weight) in relation to 100 parts by weight of the organopolysiloxane of component (A). When incorporated in an amount in excess of 50 parts by weight, the composition is likely to suffer from loss of fluidity leading to poor workability. The component (D) is preferably incorporated in 0.1 to 50 parts by weight, more preferably 1 to 50 parts by weight, and most preferably 5 to 40 parts by weight. When incorporated in such amount, the composition of the present invention is more easily imparted with a high tear strength.

Component (E)

Component (E) is an organosilicon compound having an epoxy group and an alkoxy group bonded to a silicon atom in the molecule, and the organosilicon compound is not particularly limited as long as it has the epoxy group and the alkoxy group bonded to the silicon atom in one molecule. However, in view of realizing high adhesion property, the organosilicon compound is preferably the one having at least one epoxy group and at least two alkoxy groups bonded to the silicon atom, for example, a silane or a cyclic or straight chain siloxane having 2 to 30, and preferably 4 to 20 silicon atoms which has at least one epoxy group and at least two alkoxy groups bonded to the silicon atom. The component (E) may comprise one or two or more organosilicon compounds.

Preferably, the epoxy group is bonded to the silicon atom as a glycidoxyalkyl group such as glycidoxypropyl group or an epoxy-containing cyclohexylalkyl group such as 2,3-epoxycyclohexylethyl group or 3,4-epoxycyclohexylethyl group.

Examples of the silicon atom-bonding alkoxy group include a trialkoxysilyl group such as trimethoxysilyl group, or triethoxysilyl group; or a alkyldialkoxysilyl group such as methyldimethoxysilyl group, ethyl dimethoxysilyl group, methyldiethoxysilyl group, or ethyldiethoxysilyl group.

The component (E) may also have a functional group other than the epoxy group and the alkoxy group bonded to the silicon atom in the same molecule, and the functional group may be at least one functional group selected from the group consisting of an alkenyl group such as vinyl group, (meth) acryloxy group, and hydrosilyl group (SiH group).

The organosilicon compound of component (E) may be, for example, an organosilicon compound represented by the following chemical formula:

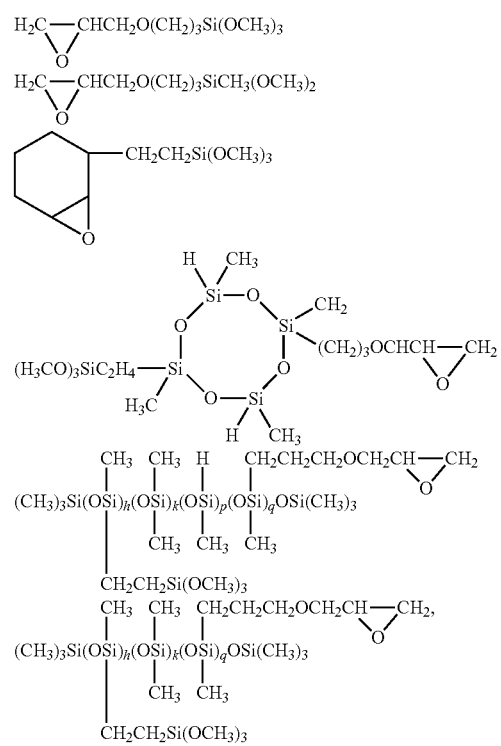

wherein h is an integer of 1 to 10, k is an integer of 0 to 100, and preferably 0 to 20, p is an integer of 1 to 100, and preferably 1 to 20, and q is an integer of 1 to 10; a mixture of two or more such compounds; or a partial hydrolytic condensate of such composition or two or more such compositions.

Component (E) may be incorporated in an amount of 0.1 to 10 parts by weight, and preferably 0.5 to 5 parts by weight per 100 parts by weight of the organopolysiloxane of component (A). When incorporated at an amount of less than 0.1 part by weight, the resulting composition may suffer from insufficient adhesion. When incorporated in an amount in excess of 10 parts by weight, no substantial improvement in the adhesion capability of the resulting composition is realized by increasing the amount of the addition and such incorporation is rather uneconomical due to the increased cost.

Component (F)

Component (F) may comprise one or both of a titanium compound (and more specifically, an organotitanium compound) and a zirconium compound (and more specifically, an organozirconium compound), and component (F) acts as a condensation co-catalyst for promoting the adhesion. The component (F) may comprise either one compound or two or more such compounds.

Examples of component (F) include titanium condensation co-catalysts (titanium compounds) including organotitatnates such as titanium tetraisopropoxide, titanium tetra n-butoxide, and titanium tetra-2-ethylhexoxide; organotitanium chelate compounds such as titanium diisopropoxy bis(acetyl acetonate), titanium diisopropoxy bis(ethyl acetoacetate), and titanium tetra acetyl acetonate; as well as zirconium condensation co-catalysts (zirconium compounds) including organozirconium ester such as zirconium tetra-n-propoxide and zirconium tetra-n-butoxide; organozirconium chelate compounds such as zirconium tributoxy monoacetyl acetonate, zirconium monobutoxy acetyl acetonate bis(ethyl acetoacetate), and zirconium tetraacetyl acetonate.

The component (F) may be incorporated in an amount of 0.1 to 5 parts by weight, and more preferably at 0.2 to 2 parts by weight per 100 parts by weight of component (A). When incorporated in less than 0.1 parts by weight, the cured product is likely to suffer from poor ability of retaining the adhesion under high temperature and high humidity conditions. The incorporation in excess of 5 parts by weight may result in the loss of the heat resistance of the cured product.

Other Components

The composition of the present invention may also contain other components in addition to components (A) to (F) as described above to the extent that the merits of the present invention is not adversely affected. Exemplary such optional components include those as described below which may be used alone or in combination of two or more.

[Reaction Regulator]

The reaction regulator is not particularly limited as long it is a compound capable of suppressing the curing by the addition reaction catalyst of component (C), and any reaction regulator that has been known in the art may be used. Exemplary such reaction regulators include phosphorus-containing compounds such as triphenylphosphine; nitrogen-containing compounds such as tributylamine, tetramethylethylenediamine, and benzotriazole; sulfur-containing compounds; acetylene compounds such as acetylene alcohol; compounds containing two or more alkenyl groups; hydroperoxy compounds; and maleic acid derivatives.

Since the degree of the curing suppression attained by the reaction regulator varies by the chemical structures of the reaction regulator, the amount of the reaction regulator added is preferably adjusted for each type of the reaction regulator used. When the reaction regulator is added at an adequate amount, the composition will enjoy long term storage stability at room temperature without detracting from the curability.

[Filler]

An inorganic filler or organic filler may be incorporated. Examples of the filler include inorganic fillers such as crystalline silica, hollow filler, silsesquioxane, fumed titanium dioxide, magnesium oxide, zinc oxide, iron oxide, aluminum hydroxide, magnesium carbonate, calcium carbonate, zinc carbonate, laminar mica, carbon black, diatomaceous earth, and glass fiber; fillers obtained by treating such inorganic filler with an organosilicon compound such as an organoalkoxysilane compound, organochlorosilane compound, organosilazane compound, or low molecular weight siloxane compound; silicone rubber powder; and silicone resin powder.

[Other Components]

Examples of the other components include organopolysiloxane having one hydrogen atom bonded to the silicon atom per molecule and not containing other functional groups; organopolysiloxane having one alkenyl group bonded to the silicon atom per molecule and not containing other functional groups; non-functional organopolysiloxane having no hydrogen atom bonded to the silicon atom, no alkenyl group bonded to the silicon atom and no other functional groups such as dimethylpolysiloxane terminated with trimethylsiloxy group; organic solvent, anti-creep-hardening agent, plasticizer, thixotropic agent, pigment, dye, and antimold.

Production Method

The liquid silicone rubber coating composition of the present invention may be prepared by mixing the components as described above by the method commonly used in the art.

Airbag

The liquid silicone rubber coating composition is highly adhesive to the base fabric for airbag, and therefore, this liquid silicone rubber coating composition is well adapted for use in forming a curtain airbag which is to be accommodated along the A-pillar to the roof side, and whose inflated state should be maintained for a certain period for the protection of the passenger's head or prevention of the passenger from being thrown out of the vehicle upon collision or roll-over of the vehicle.

In the present invention, the airbag, and in particular, the curtain airbag on which the silicone rubber coating layer is formed by coating and curing the composition may be the one having a known structure. Exemplary airbags include those prepared by using a woven fabric of 6,6-nylon, 6-nylon, polyester fiber, alamid fiber, polyamide fiber, polyester fiber, or other synthetic fiber for the base fabric having the surface corresponding to the interior of the airbag coated with the rubber. More specifically, the air bag may be an air bag prepared by placing two plain-woven fabrics one on another, adhering the fabrics by the adhesive applied along the periphery of the fabric, and sewing the fabrics together along the periphery where the adhesive has been applied; or the airbag of woven fabric formed by double weaving having the pouch structure formed by double weaving.

The layer of the liquid silicone rubber coating composition may be formed by coating the liquid silicone rubber coating composition on at least one surface, and typically on one surface of a substrate comprising a fabric cloth, and curing the coating by placing in a hot air oven to thereby form the silicone rubber coating layer. A curtain airbag may be produced by using the thus produced silicone rubber-coated base fabric for a curtain airbag.

Examples of the substrate comprising the fabric cloth include the substrate comprising a woven base fabric of synthetic fiber, and the substrate may be coated with the composition by the method commonly used in the art to a thickness (or a coating weight) of preferably about 10 to 150 g/m$^2$, more preferably about 15 to 80 g/m$^2$, and most preferably about 20 to 60 g/m$^2$.

The liquid silicone rubber coating composition of the present invention may be cured by a curing method known in the art under the conditions known in the art. For example, the liquid silicone rubber coating composition may be cured by heating the composition to 120 to 180° C. for 1 to 10 minutes.

EXAMPLES

Next, the present invention is described in further detail by referring to Examples and Comparative Examples, which by no means limit the scope of the invention. In the following description, Me stands for methyl group.

Example 1

65 parts by weight of dimethylpolysiloxane having both ends of the molecular chain capped with vinyl dimethylsiloxy group and having a viscosity at 25° C. of about 30,000 mPa·s, 8 parts by weight of hexamethyldisilazane, 2 parts by weight of water, and 40 parts by weight of fumed silica (Aerosil (™) 300 manufactured by Nippon Aerosil Co., Ltd.) having a specific surface area measured by BET method of about 300 m²/g were charged in a kneader at room temperature, and kneaded for 1 hour. The resulting mixture was heated to 150° C., and kneaded for another 2 hours. The mixture was cooled to room temperature, and to this mixture were added 19 parts by weight of dimethylpolysiloxane having both ends of the molecular chain capped with vinyldimethylsiloxy group and having a viscosity at 25° C. of about 30,000 mPa·s and 5 parts by weight of dimethylpolysiloxane containing 5% by mole of vinylmethylsiloxane unit in relation to all diorganosiloxane units in the backbone, having both ends of the molecular chain capped with trimethylsiloxy group, and having a viscosity at 25° C. of about 700 mPa·s. The mixture was kneaded until the mixture was homogeneous to produce base compound (I).

78 parts by weight of the thus produced base compound (I) was mixed with 35 parts by weight of dimethylpolysiloxane having both ends of the molecular chain capped with vinyldimethylsiloxy group and having a viscosity at 25° C. of about 5,000 mPa·s; 15 parts by weight of dimethylpolysiloxane having both ends of the molecular chain capped with vinyldimethylsiloxy group and having a viscosity at 25° C. of about 1,000 mPa·s; 10 parts by weight of organopolysiloxane resin composed of 39.5% by mole of $(CH_3)_3SiO_{1/2}$ unit, 6.5% by mole of $(CH_3)_2(CH_2=CH)SiO_{1/2}$ unit, and 54% by mole of $SiO_2$ unit; 6.4 parts by weight of organohydrogenpolysiloxane having a content of the hydrogen atoms bonded to the silicon atom of 1.08% by weight and represented by the following formula (9):

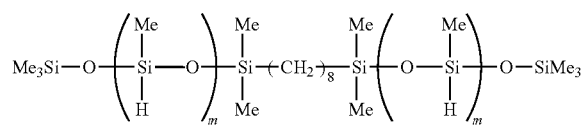

(9)

wherein each m is about 6 on average, and having a viscosity at 25° C. of 45 mPa·s; 0.09 parts by weight of 1-ethynylcyclohexanol; and 0.38 parts by weight of dimethylpolysiloxane solution containing 1% by weight of chloroplatinic acid-1,3-divinyltetramethyldisiloxane complex in terms of platinum atom content; 0.3 parts by weight of γ-glycidoxypropyltrimethoxysilane; and 0.2 parts by weight of titanium tetra-2-ethylhexoxide; to produce composition A.

The molar ratio of SiH groups in the above organohydrogenpolysiloxane to the total of vinyl groups in the above vinyl group-containing organopolysiloxane was 4.1 mol/mol (SiH/vinyl).

The resulting composition A was evaluated by the following tests (measurement of hardness, elongation at break, tensile strength, tear strength, and peel adhesion and Scot crease-flex test).

[Hardness, Elongation at Break, Tensile Strength, and Tear Strength]

Composition A was cured by pressing at 150° C. for 5 minutes, and then subjected to post-curing at 150° C. for 1 hour to produce a sheet defined in JIS K 6249, and this sheet was evaluated for hardness, elongation at break, tensile strength, and tear strength according to the procedure defined in JIS K 6249. The results are shown in Table 1.

[Peel Adhesion]

Composition A was uniformly and evenly coated to 60 g/m² by a coater on a 6,6-nylon base fabric for airbag, and the composition was cured by heating in an oven at 170° C. for 1 minute to produce a nylon base fabric covered by silicone rubber. The peel adhesion of the silicone rubber coating layer to the nylon base fabric was measured by adhering two silicone rubber-nylon base fabrics each having a width of 50 mm by using a room temperature-curable silicone adhesive (X-32-2600A/S) applied to a thickness of 0.6 mm; leaving the adhered silicone rubber-coated base fabrics at 23° C. for 24 hours for curing of the adhesive; cutting the adhered silicone rubber-coated base fabrics to prepare test pieces having a width of 20 mm; and conducting T peel test at a tensile speed of 200 mm/minute. The results are shown in Table 1.

[Scot Crease-Flex Test]

Scot crease-flex test was conducted by using a Scot crease-flex tester. The silicone rubber-coated base fabric was crumpled for 500 cycles while pressing at a pressure of 5 kgf, and the coating was visually inspected. In the test, the coated base fabric was evaluated "pass" when the silicone rubber coating layer was not peeled off the coating surface of the base fabric, and "fail" in the case of the peeled coating. The results are shown in Table 1.

Example 2

78 parts by weight of the base compound (I) produced in Example 1 was mixed with 35 parts by weight of dimethylpolysiloxane having both ends of the molecular chain capped with vinyldimethylsiloxy group and having a viscosity at 25° C. of about 5,000 mPa·s; 15 parts by weight of dimethylpolysiloxane having both ends of the molecular chain capped with vinyldimethylsiloxy group and having a viscosity at 25° C. of about 1,000 mPa·s; 10 parts by weight of organopolysiloxane resin composed of 39.5% by mole of $(CH_3)_3SiO_{1/2}$ unit, 6.5% by mole of $(CH_3)_2(CH_2=CH)SiO_{1/2}$ unit, and 54% by mole of $SiO_2$ unit; 6.4 parts by weight of organohydrogenpolysiloxane having a content of the hydrogen atoms bonded to the silicon atom of 1.08% by weight and represented by the following formula (10):

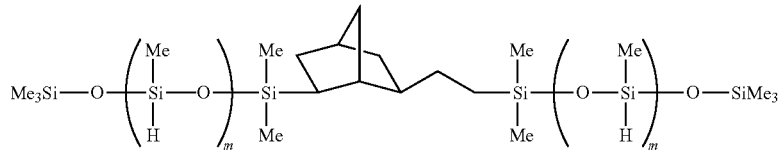

(10)

wherein each m is about 6 on average, and having a viscosity at 25° C. of 45 mPa·s; 0.09 parts by weight of 1-ethynylcyclohexanol; and 0.38 parts by weight of dimethylpolysiloxane solution containing 1% by weight of chloroplatinic acid- 1,3-divinyltetramethyldisiloxane complex in terms of platinum atom content; 0.3 parts by weight of γ-glycidoxypropyltrimethoxysilane; and 0.2 parts by weight of titanium tetra-2-ethylhexoxide; to produce composition B.

The molar ratio of SiH groups in the above organohydrogenpolysiloxane to the total of vinyl groups in the above vinyl group-containing organopolysiloxane was 4.1 mol/mol (SiH/vinyl).

Composition B was cured, and the cured product was measured for hardness, elongation at break, tensile strength, tear strength, and peel adhesion and the Scot crease-flex test was also conducted by repeating the procedure of Example 1. The results are shown in Table 1.

Example 3

78 parts by weight of the base compound (I) produced in Example 1 was mixed with 35 parts by weight of dimethylpolysiloxane having both ends of the molecular chain capped with vinyldimethylsiloxy group and having a viscosity at 25° C. of about 5,000 mPa·s; 15 parts by weight of dimethylpolysiloxane having both ends of the molecular chain capped with vinyldimethylsiloxy group and having a viscosity at 25° C. of about 1,000 mPa·s; 10 parts by weight of organopolysiloxane resin composed of 39.5% by mole of $(CH_3)_3SiO_{1/2}$ unit, 6.5% by mole of $(CH_3)_2(CH_2=CH)SiO_{1/2}$ unit, and 54% by mole of $SiO_2$ unit; 6.4 parts by weight of organohydrogenpolysiloxane having a content of the hydrogen atoms bonded to the silicon atom of 1.08% by weight and represented by the following formula (11):

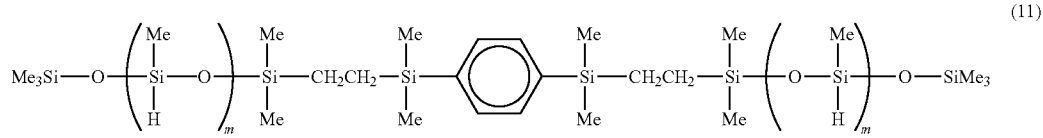

(11)

wherein each m is about 9 on average, and having a viscosity at 25° C. of 45 mPa·s; 0.09 parts by weight of 1-ethynylcyclohexanol; and 0.38 parts by weight of dimethylpolysiloxane solution containing 1% by weight of chloroplatinic acid-1,3-divinyltetramethyldisiloxane complex in terms of platinum atom content; 0.3 parts by weight of γ-glycidoxypropyltrimethoxysilane; and 0.2 parts by weight of titanium tetra-2-ethylhexoxide; to produce composition C.

The molar ratio of SiH groups in the above organohydrogenpolysiloxane to the total of vinyl groups in the above vinyl group-containing organopolysiloxane was 4.1 mol/mol (SiH/vinyl).

Composition C was cured, and the cured product was measured for hardness, elongation at break, tensile strength, tear strength, and peel adhesion and the Scot crease-flex test was also conducted by repeating the procedure of Example 1. The results are shown in Table 1.

Comparative Example 1

78 parts by weight of the base compound (I) produced in Example 1 was mixed with 35 parts by weight of dimethylpolysiloxane having both ends of the molecular chain capped with vinyldimethylsiloxy group and having a viscosity at 25° C. of about 5,000 mPa·s; 15 parts by weight of dimethylpolysiloxane having both ends of the molecular chain capped with vinyldimethylsiloxy group and having a viscosity at 25° C. of about 1,000 mPa·s; 10 parts by weight of organopolysiloxane resin composed of 39.5% by mole of $(CH_3)_3SiO_{1/2}$ unit, 6.5% by mole of $(CH_3)_2(CH_2=CH)SiO_{1/2}$ unit, and 54% by mole of $SiO_2$ unit; 6.4 parts by weight of dimethylsiloxane-methylhydrogen siloxane copolymer having a content of the hydrogen atoms bonded to the silicon atom of 1.08% by weight, having both ends of the molecular chain capped with trimethylsiloxy group and thus having hydrogen atoms bonded to the silicon atoms in the side chain of the molecular chain, and having a viscosity at 25° C. of 45 mPa·s; 0.09 parts by weight of 1-ethynylcyclohexanol; 0.38 parts by weight of dimethylpolysiloxane solution containing 1% by weight of chloroplatinic acid-1,3-divinyl tetramethyldisiloxane complex in terms of platinum atom content; 0.3 parts by weight of γ-glycidoxypropyltrimethoxysilane; and 0.2 parts by weight of titanium tetra-2-ethylhexoxide; to produce composition D.

The molar ratio of SiH groups in the above organohydrogenpolysiloxane to the total of vinyl groups in the above vinyl group-containing organopolysiloxane was 4.1 mol/mol (SiH/vinyl).

Composition D was cured, and the cured product was measured for hardness, elongation at break, tensile strength, tear strength, and peel adhesion and the Scot crease-flex test was also conducted by repeating the procedure of Example 1. The results are shown in Table 1.

Comparative Example 2

The procedure of Example 1 was repeated except that 0.2 parts by weight of the titanium tetra-2-ethylhexoxide was not used in the composition A of Example 1. The resulting composition E after curing was measured for hardness, elongation at break, tensile strength, tear strength, and peel adhesion and the Scot crease-flex test was also conducted by repeating the procedure of Example 1. The results are shown in Table 1.

Comparative Example 3

The procedure of Example 2 was repeated except that 0.3 parts by weight of the γ-glycidoxypropyltrimethoxysilane was not used in the composition B of Example 2. The resulting composition F after curing was measured for hardness, elongation at break, tensile strength, tear strength, and peel adhesion and the Scot crease-flex test was also conducted by repeating the procedure of Example 1. The results are shown in Table 1.

TABLE 1

|  | Example | | | Comparative Example | | |
|---|---|---|---|---|---|---|
|  | 1 | 2 | 3 | 1 | 2 | 3 |
| Durometer hardness (type A) | 47 | 47 | 47 | 47 | 47 | 47 |
| Elongation at break (%) | 330 | 320 | 330 | 330 | 320 | 330 |
| Tensile strength (MPa) | 5.5 | 5.4 | 5.6 | 5.5 | 5.1 | 5.5 |
| Tear strength (kN/m) | 20 | 19 | 20 | 20 | 18 | 19 |

TABLE 1-continued

|  | Example | | | Comparative Example | | |
| --- | --- | --- | --- | --- | --- | --- |
|  | 1 | 2 | 3 | 1 | 2 | 3 |
| Peel adhesion (N/cm) | 80 | 80 | 80 | 45 | 20 | 20 |
| Scot crease-flex test | Pass | Pass | Pass | Fail | Fail | Fail |

Reference Example 1

Production Method of the Organohydrogenpolysiloxane Represented by the Formula (9)

A four-necked flask equipped with a stirrer, a thermometer, a reflux condenser, and a dropping funnel was charged with 1,7-octadiene (110 parts by weight), toluene (a solvent, 120 parts by weight), and a toluene solution containing Pt at 0.5% by weight (a platinum catalyst, 0.5 parts by weight), and the mixture was heated to 65° C. A siloxane monomer represented by the following formula (12):

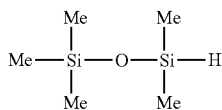
(12)

(326 parts by weight) was then incrementally added. After the addition, the reaction was allowed to proceed at 70° C. for 3 hours, and active carbon (3.0 parts by weight) was added. After stirring the mixture at room temperature for 8 hours, the active carbon was separated by filtration, and the filtrate was heated to 90° C. at 30 mmHg to remove the toluene and volatile contents by distillation to thereby produce siloxane oligomer 1 (406 parts by weight).

Next, this siloxane oligomer 1 (51 parts by weight) was charged in a four-necked flask equipped with a stirrer, a thermometer, a reflux condenser, and a dropping funnel with 1,3,5,7-tetramethylcyclotetrasiloxane (102 parts by weight). Trifluoromethanesulfonic acid (0.1 parts by weight) was added with stirring and the mixture was stirred at room temperature for 10 hours. Kyowaad 500SH (manufactured by Kyowa Chemical Industry Co., Ltd.) (0.9 parts by weight) was then added, and the mixture was stirred at room temperature for another 4 hours. Kyowaad 500SH was then separated by filtration, and the filtrate was heated to 120° C. at 20 mmHg to remove the components which failed to react by distillation. Organohydrogen polysiloxane 1 (150 parts by weight) was thereby obtained.

The organohydrogenpolysiloxane 1 was a pale yellow transparent liquid having a viscosity of 45 mm²/s and hydrogen gas generation of 248 mL/g. The organohydrogenpolysiloxane 1 was also analyzed by NMR to confirm that it was a polymer having a structure represented by the following formula (9):

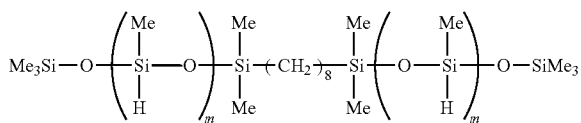
(9)

wherein each m is about 6 on average.

Reference Example 2

Production Method of the Organohydrogenpolysiloxane Represented by Formula (10)

A four-necked flask equipped with a stirrer, a thermometer, a reflux condenser, and a dropping funnel was charged with vinyl norbornene (120 parts by weight), toluene (a solvent, 120 parts by weight), and a toluene solution containing Pt at 0.5% by weight (a platinum catalyst, 0.5 parts by weight), and the mixture was heated to 65° C. A siloxane monomer represented by the following formula (12):

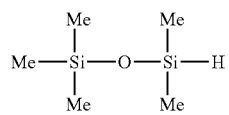
(12)

(326 parts by weight) was then incrementally added. After the addition, the reaction was allowed to proceed at 70° C. for 3 hours, and active carbon (3.0 parts by weight) was added. After stirring the mixture at room temperature for 8 hours, the active carbon was separated by filtration, and the filtrate was heated to 90° C. at 30 mmHg to remove the toluene and volatile contents by distillation to thereby produce siloxane oligomer 2 (416 parts by weight).

Next, this siloxane oligomer 2 (51 parts by weight) was charged in a four-necked flask equipped with a stirrer, a thermometer, a reflux condenser, and a dropping funnel with 1,3,5,7-tetramethylcyclotetrasiloxane (102 parts by weight). Trifluoromethanesulfonic acid (0.1 parts by weight) was added with stirring and the mixture was stirred at room temperature for 10 hours. Kyowaad 500SH (0.9 parts by weight) was then added, and the mixture was stirred at room temperature for another 4 hours. Kyowaad 500SH was then separated by filtration, and the filtrate was heated to 120° C. at 20 mmHg to remove the components which failed to react by distillation. Organohydrogenpolysiloxane 2 (150 parts by weight) was thereby obtained.

The organohydrogenpolysiloxane 2 was a pale yellow transparent liquid having a viscosity of 46 mm²/s and hydrogen gas generation of 248 mL/g. The organohydrogenpolysiloxane 2 was also analyzed by NMR to confirm that it was a polymer having a structure represented by the following formula (10):

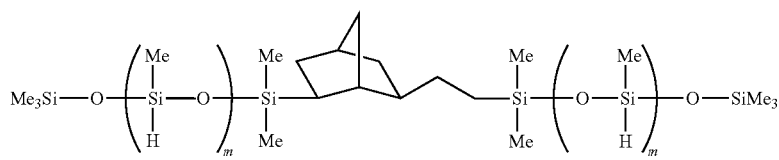

(10)

wherein each m is about 6 on average.

Reference Example 3

Production Method of the Organohydrogenpolysiloxane Represented by the Formula (11)

A four-necked flask equipped with a stirrer, a thermometer, a reflux condenser, and a dropping funnel was charged with 1,4-bis(dimethylvinylsilyl)benzene represented by the following formula (13):

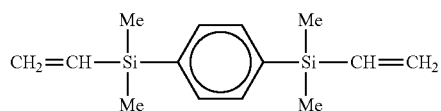

(13)

(246 parts by weight), toluene (a solvent, 120 parts by weight), and a toluene solution containing Pt at 0.5% by weight (a platinum catalyst, 0.5 parts by weight), and the mixture was heated to 65° C. A siloxane monomer represented by the following formula (12):

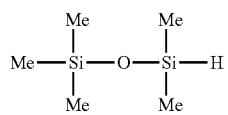

(12)

(326 parts by weight) was then incrementally added. After the addition, the reaction was allowed to proceed at 70° C. for 3 hours, and active carbon (3.0 parts by weight) was added. After stirring the mixture at room temperature for 8 hours, the active carbon was separated by filtration, and the filtrate was heated to 90° C. at 30 mmHg to remove the toluene and volatile contents by distillation to thereby produce siloxane oligomer 3 (542 parts by weight).

Next, this siloxane oligomer 3 (55 parts by weight) was charged in a four-necked flask equipped with a stirrer, a thermometer, a reflux condenser, and a dropping funnel with 1,3,5,7-tetramethylcyclotetrasiloxane (102 parts by weight). Trifluoromethanesulfonic acid (0.1 parts by weight) was added with stirring and the mixture was stirred at room temperature for 10 hours. Kyowaad 500SH (0.9 parts by weight) was then added, and the mixture was stirred at room temperature for another 4 hours. Kyowaad 500SH was then separated by filtration, and the filtrate was heated to 120° C. at 20 mmHg to remove the components which failed to react by distillation. Organohydrogenpolysiloxane 3 (158 parts by weight) was thereby obtained.

The organohydrogenpolysiloxane 3 was a pale yellow transparent liquid having a viscosity of 50 mm$^2$/s and hydrogen gas generation of 248 mL/g. The organohydrogenpolysiloxane 3 was also analyzed by NMR to confirm that it was a polymer having a structure represented by the following formula (11):

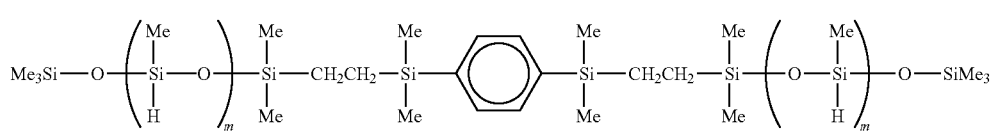

(11)

wherein each m is about 9 on average.

Japanese Patent Application No. 2009-210334 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A liquid silicone rubber coating composition comprising
(A) 100 parts by weight of an organopolysiloxane having at least 2 alkenyl groups bonded to silicon atoms per molecule;
(B) an organohydrogenpolysiloxane comprising in the molecule at least 2 structural units represented by the following formula (1), which are connected together via a SiH-free non-siloxane structural unit,

(1)

wherein $R^1$ is an unsubstituted or substituted monovalent hydrocarbon group having 1 to 10 carbon atoms and a is an integer of 2 or more, in an amount such that 1 to 10 hydrogen atoms bonded to silicon atoms in component (B) are present in relation to one alkenyl group bonded to a silicon atom in component (A);

(C) an addition reaction catalyst;
(D) 0 to 50 parts by weight of fine powder silica having a specific surface area of at least 50 m²/g;
(E) 0.1 to 10 parts by weight of an organosilicon compound having an epoxy group and an alkoxy group bonded to a silicon atom in the molecule; and
(F) 0.1 to 5 parts by weight of at least one member selected from a titanium compound and a zirconium compound.

2. The liquid silicone rubber coating composition according to claim 1 wherein the organohydrogenpolysiloxane of component (B) comprises the structure in which one or two or more structural units of the following formula (2) are connected:

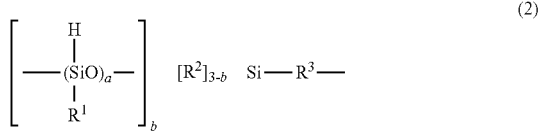

wherein $R^1$ and a are as defined above, $R^2$ is a substituted or unsubstituted monovalent hydrocarbon group of 1 to 10 carbon atoms, $R^3$ is a substituted or unsubstituted divalent hydrocarbon group of at least 2 carbon atoms which may contain a silicon atom, and b is 1, 2 or 3.

3. The liquid silicone rubber coating composition according to claim 2 wherein $R^3$ in the organohydrogenpolysiloxane of formula (2) in component (B) is a straight chain, branched, or cyclic alkylene group having 2 to 20 carbon atoms which may contain a diorganosilylene group; or a divalent aromatic hydrocarbon group having 6 to 40 carbon atoms containing 1 to 4 phenylene skeletons which may contain a diorganosilylene group.

4. The liquid silicone rubber coating composition according to claim 1 wherein the organohydrogenpolysiloxane of component (B) is linear or branched and terminated with a $(R^2)_3SiO$— and/or $H(R^2)_2SiO$— group wherein $R^2$ is a substituted or unsubstituted monovalent hydrocarbon group of 1 to 10 carbon atoms.

5. The liquid silicone rubber coating composition according to claim 1 wherein component (F) is an organotitanium compound.

6. The liquid silicone rubber coating composition according to claim 5 wherein the organotitanium compound of component (F) is an organotitanate, an organotitanium chelate compound, or a combination thereof.

7. The liquid silicone rubber coating composition according to claim 1 wherein component (F) is an organozirconium compound.

8. The liquid silicone rubber coating composition according to claim 7 wherein the organozirconium compound of component (F) is an organozirconium ester, an organozirconium chelate compound, or a combination thereof.

9. The liquid silicone rubber coating composition according to claim 1 wherein the organohydrogenpolysiloxane of component (B) comprises the structure in which one or two or more structural units of the following formula (2)-1 are connected:

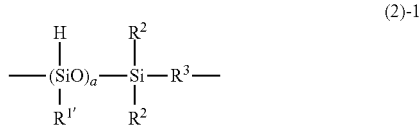

wherein $R^1$ is independently a substituted or unsubstituted monovalent hydrocarbon group having 1 to 10 carbon atoms and not containing an aliphatic unsaturated bond, and a is an integer of 2 to 200, $R^2$ is a substituted or unsubstituted monovalent hydrocarbon group having 1 to 10 carbon atoms and not containing an aliphatic unsaturated bond, and $R^3$ is a linear, branched or cyclic alkylene group having 2 to 20 carbon atoms optionally containing a diorganosilylene group of —$(R^2)_2Si$— structure, or a divalent arylene group or an alkylene-arylene group having 6 to 40 carbon atoms in which 1 to 4 phenylene skeletons are contained and optionally containing a diorganosilylene group of —$(R^2)_2Si$— structure.

10. The liquid silicone rubber coating composition according to claim 9 wherein the organohydrogenpolysiloxane of component (B) comprises two or more structural units of the formula (2)-1 in which two of —$R^3$— are connected to each other.

11. The liquid silicone rubber coating composition according to claim 9 wherein the organohydrogenpolysiloxane of component (B) is terminated with a $(R^2)_3SiO$— and/or $H(R^2)_2 SiO$— group.

12. The liquid silicone rubber coating composition according to claim 10 wherein the organohydrogenpolysiloxane of component (B) is terminated with a $(R^2)_3SiO$— and/or $H(R^2)_2 SiO$— group.

13. A method for producing a curtain airbag comprising the steps of coating the coating composition of claim 1 on at least one surface of a substrate comprising a fiber cloth, and curing the coating composition to form a silicone rubber coating layer of the cured product of the coating composition on at least one surface of the substrate.

14. A curtain airbag comprising
a substrate made of a fiber cloth, and
a silicone rubber coating layer formed by coating a liquid silicone rubber coating composition comprising
(A) 100 parts by weight of an organopolysiloxane having at least 2 alkenyl groups bonded to silicon atoms per molecule;
(B) an organohydrogenpolysiloxane comprising in the molecule at least 2 structural units represented by the following formula (1), which are connected together via a SiH-free non-siloxane structural unit,

wherein $R^1$ is an unsubstituted or substituted monovalent hydrocarbon group having 1 to 10 carbon atoms and a is an integer of 2 or more, in an amount such that 1 to 10 hydrogen atoms bonded to silicon atoms in component (B) are present in relation to one alkenyl group bonded to a silicon atom in component (A);
(C) an addition reaction catalyst;
(D) 0 to 50 parts by weight of fine powder silica having a specific surface area of at least 50 m²/g;

(E) 0.1 to 10 parts by weight of an organosilicon compound having an epoxy group and an alkoxy group bonded to a silicon atom in the molecule; and
(F) 0.1 to 5 parts by weight of at least one member selected from a titanium compound and a zirconium compound on at least one surface of the substrate and curing said composition.

\* \* \* \* \*